United States Patent [19]
Spanraft et al.

[11] 4,261,274
[45] Apr. 14, 1981

[54] DEFORMATION PROPERTIES OF THE EDGE OF A DEEP-DRAWN METAL CAN

[75] Inventors: Mihály J. Spanraft, Nijmegen; Leo Hartman, Beverwijk, both of Netherlands

[73] Assignee: Hoogovens Ijmuiden B.V., Ijmuiden, Netherlands

[21] Appl. No.: 33,695

[22] Filed: Apr. 26, 1979

Related U.S. Application Data

[63] Continuation of Ser. No. 868,384, Jan. 10, 1978, abandoned.

[30] Foreign Application Priority Data

Jan. 14, 1977 [NL] Netherlands .......................... 7700347

[51] Int. Cl.³ .............................................. B21D 24/16
[52] U.S. Cl. ............................. 113/120 H; 113/120 N
[58] Field of Search .......... 113/120 R, 120 H, 120 N; 148/9 R, 96; 219/121 L, 121 LM, 121 LJ, 121 LN, 121 LK

[56] References Cited

U.S. PATENT DOCUMENTS

| 3,134,010 | 5/1964 | Bettermann et al. | 219/121 LN |
| 3,474,219 | 10/1969 | Steigerwald et al. | 219/121 LJ |
| 3,578,936 | 5/1971 | Gerber | 148/9.6 |
| 3,597,578 | 8/1971 | Sullivan et al. | 219/121 LN |
| 3,960,624 | 6/1976 | Erlandson | 219/121 LM |
| 3,994,251 | 11/1976 | Hake et al. | 113/120 R |
| 4,100,393 | 7/1978 | Luther | 219/121 LJ |

Primary Examiner—Lowell A. Larson
Attorney, Agent, or Firm—Stevens, Davis, Miller & Mosher

[57] ABSTRACT

A method of producing a metal can or similar object by drawing and ironing wherein subsequent to the drawing process the edge of the can or object is cut to size, while the can or object is rotated about its longitudinal axis, by means of a laser beam whereby the deformation properties of the edge are improved.

4 Claims, 1 Drawing Figure

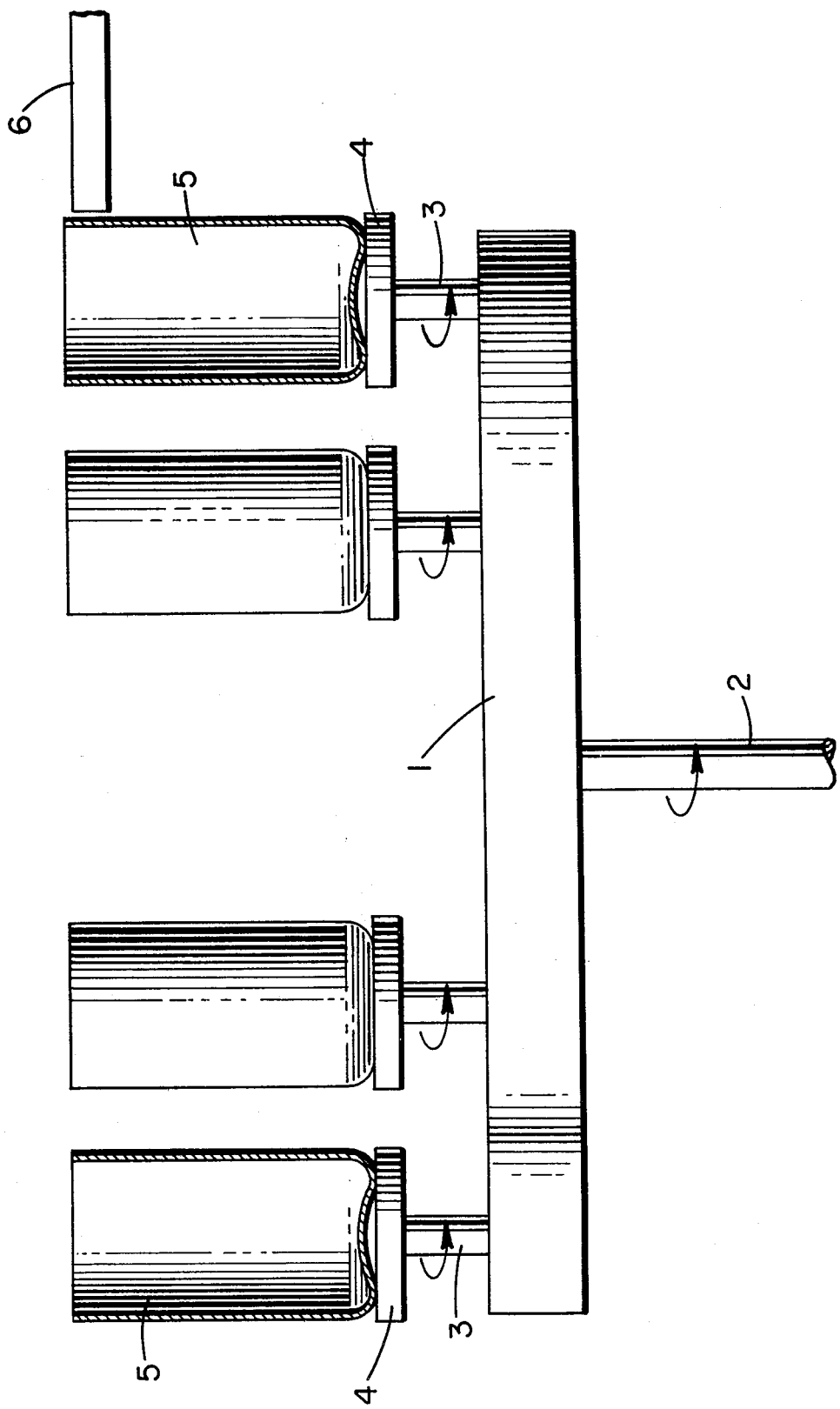

DEFORMATION PROPERTIES OF THE EDGE OF A DEEP-DRAWN METAL CAN

This is a Continuation of application Ser. No. 868,384 filed Jan. 10, 1978, now abandoned.

This invention relates to a method of producing a metal can or similar cup or can shaped object produced by the process known as "drawing and ironing", particularly for improving the deformation properties of the edge of such an object when cutting it to the required dimensions. "Drawn and ironed" cans are to be distinguished from "deep-drawn" cans because in drawing and ironing the metal is almost completely plastically deformed, as in an extrusion process.

Known apparatus for cutting the edges of cans is equipped with a fastening mechanism by which the can can be temporarily fastened to driving means for rotating the can round its longitudinal axis, and a mechanical cutting tool which can be moved against the can where the edge is to be cut off to cut the can to the desired size.

In the manufacture of cans it is essential, after shaping of the metal sheet into a can by drawing and ironing, to remove the ragged edge of the can and to trim the height of the remainder accurately. In doing so it is customary to press a rotating cutting knife against the inner wall of the can whilst rotating the can about its axis; an outer knife or an outer support serves to counteract the pressing force of the inner knife. (However, various other arrangements are feasible and are known). In the case just described it is of importance that the edges of the cans can be cut off at a rate which is adapted to the production rate of the cans. If the cutting-off rate is lower that the rate at which the cans are deep drawn, it will be necessary to provide a number of cutting tools for each deep-drawing machine.

A major disadvantage of the known method is that, during cutting, small notches or hair cracks appear in the material across the cut. These notches cause problems when the edges are submitted to further flanging and sealing operations. In order to control these problems, severe requirements are set for both the quality and the dimensions of the material used. This phenomenon of notch formation also restricts the applicability of thinner sheet material and of the more efficient necker-flanging systems for the scaling of the cans.

Another objection to the method already known is that mechanical edge-cutting can only be successful if the edge has a certain width. This results in unnecessary loss of material. The fact that mechanical edge-cutting raises special problems with non-round cans and in particular with cans having corners is also considered to be an objection.

According to the invention, there is provided a method of producing a metal can or similar object by drawing and ironing wherein subsequent to the drawing process the edge of the can or object is cut to size, whilst the can or object is rotated about its longitudinal axis by means of a laser beam. Using this method it is possible to obtain improved deformation properties of the cut edge.

Furthermore, the invention can provide a method in which the speed of operation of the cutting device may be adapted to the speed of output of one or even several deep-drawing machines, so that for instance only one cutting device is required for each deep-drawing machine.

A special advantage obtainable with the new method is that the occurrence of hair cracks across the cut edge can be prevented or reduced, while at the same time greater precision can be achieved in respect of the path of the cut and of the dimensions of the shaped can, even if thinner sheet material is used. The material chosen may be one which is in itself more liable to the occurrence of hair cracks, notches, etc., than materials used previously and may therefore be less expensive. Even small cracks or material flaws existing in the edge before cutting may be far more easily detectable, thus enabling stricter quality control.

As a result of the invention, an additional advantage may be gained in the maintenance of the cutting device. Moving parts can be avoided, the installation may more easily be accessible and excessive wear may not occur. In this way the risk of breakdowns is obviously reduced. Apparatus for carrying out the new method can be more widely applicable in the sense that it is applicable to cans over a wide range of dimensions and shapes; it can also be adjusted without difficulty from one type of can to another.

As mentioned above, another advantage of the new method can be that the composition of the can edge in the vicinity of the cut is from a metallurgical point of view more suitable for subsequent treatment. The new method also allows narrower edge portions to be cut off, which may lead to a considerable saving of material.

It may finally be mentioned that in contrast to operation with conventional devices having rotating knives, disposal of the cut off edge does not raise problems that, if a cut off edge is bent, it may get entangled in the cutting tool and/or the can.

It is pointed out that the use of lasers for cutting metal tubing is not in itself new. Until now, however, the use of laser beams for improving the surface conditions and the metallurgical properties of cut edges in order to improve their deformation properties, especially for subsequent flanging of them, has not been considered or suggested as a possibility. Especially in the relation to the production of cans, this process can in fact result in a very considerable improvement. In this connection it may also be remarked that it was known that the use of laser beams may cause little or hardly any harm to the mechanical properties of the material next to the cut edge. It has not been proposed previously, however, to use laser beams for improving such properites for specific applications, such as flanging.

Although good results are obtainable with the use of lasers of the discontinuous type, best results have been obtained by using lasers of the continuous type, especially so-called $CO_2$-lasers. It is conceivable to move the laser around the edge of the can. However, it has appeared that it is preferable to move the body of the can in front of the laser which is held stationary. High cutting speeds can be achieved, e.g. 0.25 m/sec with a relatively low powered laser (425 Watts). The cutting speed can be increased proportionally with the laser power and it is possible to achieve cutting speeds of at least 1.0 m/sec., preferably between 1.5 and 2.0 m/sec.

It has appeared that, for the effect required of the laser, the only factors playing a notable part are the focussing of the laser beam and the capacity of the laser beam.

Lasers that meet the requirements of the invention can be fitted easily to existing devices for cutting cans to size.

The annexed drawing illustrates schematically an installation according to the invention.

Reference numeral 1 indicates a rotatable turntable with a driving shaft 2. Turntable 1 carries a multitude of driven spindles 3, each being provided with fastening means 4 for holding drawn and ironed cans 5. The fastening means 4 may consist of magnetic or vacuum devices, or any other known and suitable devices for holding cans 5 while they are rotated. A $CO_2$-laser 6 is placed opposite the side-wall of each can in the indicated position, and as near said side-wall as is practically possible for an uninterrupted operation.

The lasser is able to produce a coherent beam with a width of 0.05 m.m.

Also provided, but not shown, are suitable mounting and demounting means for mounting the cans onto the fastening means 4 and for removing them thereupon after trimming.

EXAMPLE

A single laser cutting device for carrying out the invention was connected to receive the outputs of five machines for producing drawn and ironed beer cans (diameter 6.6 cm) from unkilled steel. In a known manner, this device was equipped with a rotary spindle provided at both ends with suction cups, a design which is suitable for clamping the can bottoms temporarily so as to allow them to rotate round their own axes as the continuation of the rotary spindle. Opposite the spot where the can edge is to be cut off, a laser was placed with a capacity of 425 W. The cutting speed was 0.25 m/sec.

No particular problems arose when the cans were processed at the rate of 600 a minute. At this rate one cutting machine could keep up with the output of five deep-drawing machines instead of the five mechanical cutting devices previously used. Maintenance of the cutting device is virtually negligible.

A comparison of deformation characteristics was made between 200 cans trimmed in this way by the laser and 200 cans trimmed (also at 118 mm height) mechanically. To this end, a deformation similar to that used in closing the cans with a copper. It was found that the deformation properties of the laser trimmed cans were improved by about 30 % with respect to the same properties of the mechanically trimmed cans.

It has also appeared that rejects of treated cans on account of the occurrence of cracked edges and deformities could be reduced from about 5 per 1000 cans to practically none at all, while at the same time rejects of poorly sealed cans could be drastically cut down. It is pointed out that any flaws or cracks existing in the material at the level of the cut before treatment are not included in these figures. However, such flaws in the cut can apparently be more easily detected after the new treatment, so that quality control of defective cans becomes more selective and more reliable.

The above indicated deformation properties were measured as follows.

Into the trimmed cans a cone is placed with a top-angle of 75 degrees. This cone is thereupon pressed at constant speed into the can, whereby a force-displacement diagram is recorded until the reaction force from the can-rim falls of. This is an indication that the material starts cracking. The displacement of the cone is then an indication of the deformation properties.

What we claimed is:

1. A method of producing a drawn and ironed metal can free of hair cracks after being cut, the metal of which is capable of forming hair cracks by mechanical cutting, comprising cutting subsequent to the drawing process the edge of the can to size by means of a continuous $CO_2$ laser beam, while the can is rotated about its longitudinal axis.

2. A method according to claim 1 wherein the edge being cut is moved at a speed of at least 1.0 m/sec in front of the stationary laser.

3. A method according to claim 2 wherein the said edge is moved at a rate in the range 1.5 to 2.0 m/sec. in front of the laser.

4. A drawn and ironed metal can when produced by a method according to claim 1.

* * * * *